A. B. JOHNSON.
NUT AND BOLT LOCK.
APPLICATION FILED JUNE 19, 1917.
1,324,012.
Patented Dec. 2, 1919.
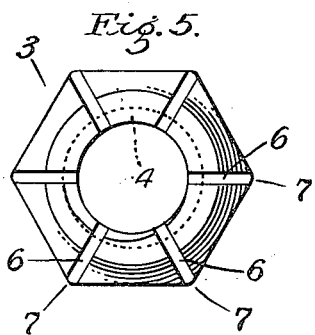
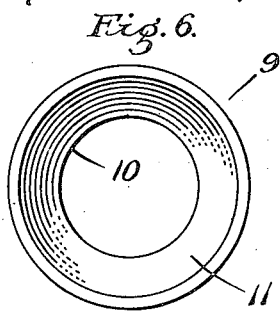
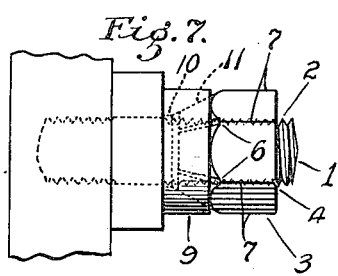
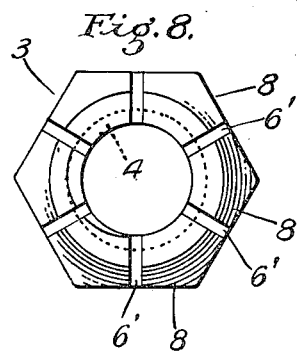
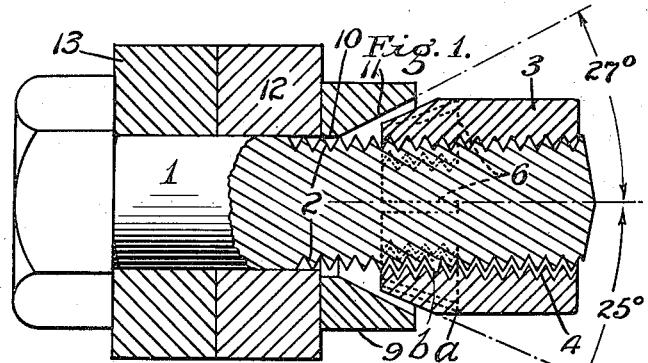
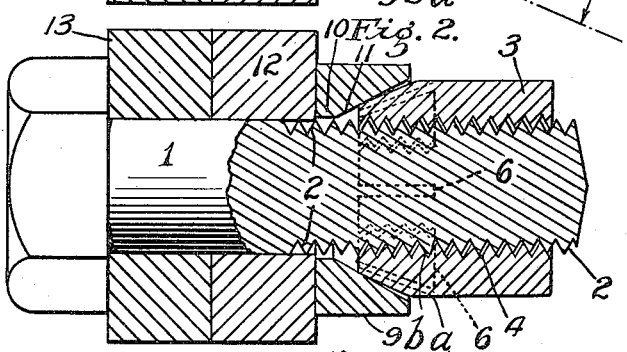
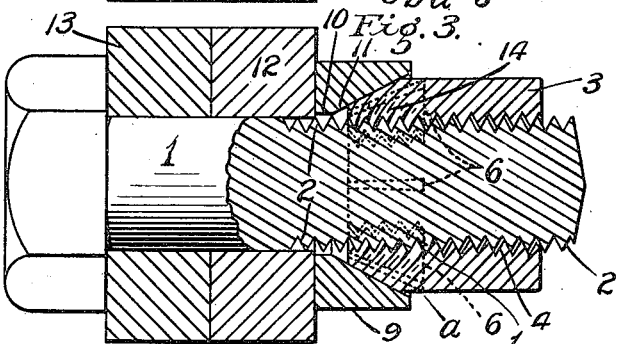
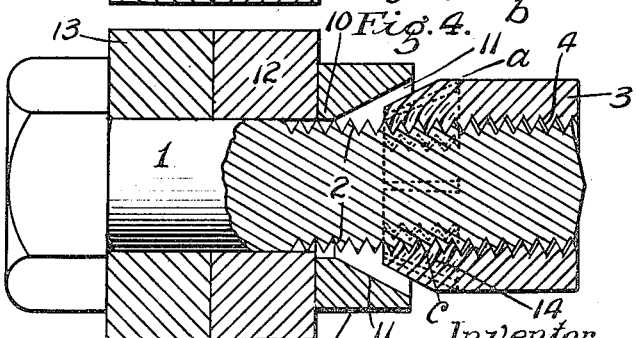
Witness
H. N. Kirkby
Inventor
Adolph B. Johnson
by James R. Townsend
his atty

UNITED STATES PATENT OFFICE.

ADOLPH B. JOHNSON, OF LOS ANGELES, CALIFORNIA.

NUT AND BOLT LOCK.

1,324,012.     Specification of Letters Patent.     Patented Dec. 2, 1919.

Application filed June 19, 1917. Serial No. 175,696.

*To all whom it may concern:*

Be it known that I, ADOLPH B. JOHNSON, a citizen of the United States, residing at Los Angeles, in the county of Los Angeles and State of California, have invented a new and useful Nut and Bolt Lock, of which the following is a specification.

An object of this invention is to provide for fastening two or more parts together with a positive lock effect, by means including a nut which can be spun by hand into position for final tightening and which means will clamp the parts tightly together, will be free from any likelihood of unscrewing by reason of vibration of the parts, either in the tight position or when loosened; which can be unscrewed by a wrench to allow play of the parts if desired, and when so unscrewed will remain friction tight on the bolt; which can be unscrewed so that the nut may be removed from the bolt; and in which the nut can again be screwed into place and the parts tightened thereby, as before and as required, without injury to the bolt or to any part of the locking device; and in which the device will act as a thread corrector to correct any irregularities that may be present in the bolt threads.

An object of the invention is to provide for aeroplanes, railways, bridges, machinery and other structures having parts to be fastened together, a nut so locked upon a bolt that it will be proof against being loosened by any vibration of the parts which it fastens together the nut being of such construction that it can be used and reused indefinitely with the same great ease and facility as any ordinary nut, and with or without retapping.

The improvement set forth in nut and bolt locks is of that class in which a washer and a nut having a split conical end, are elements, and comprises, in combination with a washer having a conical cup, a nut having stubs at one end that are of less length than the conical cup and that constitute a split taper end for the nut, which end has a more acute angle than the conical cup, so that as the nut is screwed home by thumb and finger, contact between the washer and the stubs will occur only at the tips of the stubs, the material of said stubs being adapted to receive a permanent set at that position of the stubs relative to the nut body in which position the taper of the stubs and that of the conical cup or nut seat are brought into conformity to each other by the pressure exerted by screwing the nut home by means of a wrench; so as to allow, and for the purpose of allowing a fresh nut to be screwed home freely by thumb and finger of the workman until the tip of the nut engages the washer, and then by a few turns of the nut by means of a wrench, to give a permanent set to the stubs whereby the nut is thus transformed at the close of the operation of screwing it home with a wrench, into a friction tight nut which can only be turned on the bolt by a wrench irrespective of the subsequent relative positions of the nut and the washer on the bolt.

The invention is adapted to application with various diameters of bolts and with various threads and with tight fitting and loose fitting nuts, indiscriminately, and is adapted to enable the locking of the bolt to be effective irrespective of whether the bolt is tight or loose, and whether the nut does or does not engage any part other than the bolt; it being a principle of this invention that a nut is provided with one or more stubs capable of being given a permanent set that will produce a constant frictional engagement with the threaded portion of the bolt, thus to prevent unscrewing, which, when the bolt is subjected to constant vibration, might automatically occur, should the stubs engage the threads simply by spring pressure.

The invention is broadly new and basic in the provision on the nut of stubs that can be given a permanent set by the operation of screwing the nut home into a taper seat, and is distinguished from nut-locks having forwardly extending tongues, fingers or lugs adapted to be sprung into contact with and bound upon a bolt by means of a conical seat into which the fingers are wedged when the nut is screwed home, it being important in this respect that the nut be provided with stubs so that they can be permanently upset by the limited displacement allowed, by the close fit of nut and bolt; and will not be simply sprung in when the nut is tightened, to again spring out when looseness between the taper seat and the taper tongues occurs from stretching of the bolt or compression of the material of the engaging parts.

It is not only important that the projections from the nut shall be short relatively thick truncated projections or stubs, but also that they shall have external faces of a determined angle adapted to effect the required upsetting of the material.

These angles and the other features of the invention necessary for attaining the objects hereinbefore enumerated will be fully set forth in the detail description.

The accompanying drawing illustrates the invention.

Figure 1 is a view in axial section of a permanent-set bolt lock applied to and ready to be screwed home on a bolt connecting two members.

Fig. 2 is a view analogous to Fig. 1 with the unset stubs contacting just enough with the swage to center the nut and swage on the bolt.

Fig. 3 is a view analogous to Figs. 1 and 2 showing the bolt-lock set.

Fig. 4 is a view analogous to Figs. 1, 2 and 3 showing the bolt-lock unscrewed from the swage.

Fig. 5 is a view of the stub ends on the nut shown in Figs. 1–4.

Fig. 6 is a view of the swage.

Fig. 7 is an external view of the stud-lock, set.

Fig. 8 is a view of another form of the stub ends on a nut.

For graphic illustration the nut shown in Figs. 1–4 is a loose fitting nut, but it is understood that it is sufficient for the purposes of this invention that the nut be only loose enough to be readily turned with the fingers of the hand so that the nut can be spun home on the bolt with great ease and rapidity in the process of assembling the unset bolt-lock.

The defect $b$ in the bolt thread of Figs. 1–3 is shown corrected at $c$ by a set stub of the unscrewed nut.

The bolt 1 may be of any well known form having threads 2 of any approved standard. Upon this the loose fitting nut having the usual substantial body 3 and standard screw threads 4 is adapted to be screwed. Said nut is provided with forwardly projecting stubs 5 which are adapted to receive a permanent non-resilient set, and with this object in view are constructed with roots $a$ corresponding in thickness to the solid wall or body 3 of the nut, and said stubs taper forwardly from the roots, their outer faces converging at a suitable angle to the axis of the nut, viz., an angle of about 25°. Said stubs are internally threaded by extension of the nut threads 4. Said stubs are separated by slots 6 that may extend to the corners 7 of the nut as shown in Fig. 5 or may extend to the faces 8 of said nut as shown at 6' in Fig. 8 and that accommodate such displacement of the stubs as is requisite to allow such permanent set to be imposed upon them.

The swage 9 is a washer having a central bore 10 of a diameter somewhat larger than the diameter of the bolt, and having a frusto-conical seat 11, the walls of which are at an angle of about 27° to the axis of the bore 10, so that when the swage is applied to the bolt 1 and engages one of the members 12, 13 through which the bolt 1 passes and the nut is screwed home the tips of the stubs will engage the swage as at Fig. 2 and as the nut is screwed home the swage will impose upon, or give to the stubs a permanent set as indicated at 14 in Figs. 3 and 4.

It is important that the angles of the outer faces of the stubs be nearly the angle shown in order that the necessary pressure may be secured by turning the nut on the threaded portion of the bolt, by means of a wrench; and it is also necessary that the divergence of the angle of the outer faces of the stubs and the inner face of the swage shall be very close to that shown. If the angle is too acute or too obtuse an effective permanent upsetting of the stubs cannot be made by screwing the bolt home. It is important also that the depth of the slots shall be proportional to the depth shown in the drawings and, further, that the body of the nut shall be substantial and practically equal in cross-sectional area at the juncture of any stub, to the root of said stub so as to avoid springing the nut to accommodate the strain, as such springing of the nut will prevent the upsetting action depended upon for the permanent lock which is essential in this class of appliances.

With the construction shown in which the angle of the outer faces of the stubs to the axis of the nut is 25°, the stubs may be given a permanent set by pressure applied to such face in lines parallel to the axis of the nut; and may be made to even compress the bolt engaged by and between said stubs, so that the compression may be measured by a thread micrometer. The tips of the stubs after being set will be sprung out as the nut is unscrewed over the outer end of the bolt but will spring back when the nut is off the bolt, so that the nut is not again so easily applied to the bolt as at first.

In the case of the loose fit nut shown in Figs. 1–4, the swage and nut may rest eccentrically of the bolt as in Fig. 1, until the nut is almost screwed home as in Fig. 2. Then the nut and swage may become concentric with the bolt, and as shown in Figs. 3 and 4, the stubs when swaged conform to the threads of the bolt, thus taking up the looseness of the nut and of the swaging washer.

It is understood that the nut and swage are not required to have the loose fit shown in Figs. 1 and 2, nor is it necessary that the nut should be set so tightly as to cause the stubs to compress the bolt; for when the nut has been screwed home sufficiently to give a permanent set to the stubs, the friction of said stubs on the bolt will be continuous irrespective of the position of the nut on the bolt. In case of constant vibration as with bolts for the crank case of an internal combustion engine or the bolts in any other situation where long strain and constant vibration are present, any looseness that may come between the fastening member 12 and the swage, thus relieving the pressure between the swage and the stubs, will not release the lock, for the reason that the friction between the threads of the permanently set stubs and those of the bolt remains constantly too great to allow the nut to automatically unscrew. Any retracting pressure by the swage upon the stubs simply serves to tighten the stubs and without such pressure there is no force applied to the nut that is in a direction to loosen the nut, and therefore said nut may be unscrewed to allow looseness between the fastened parts 12, 13 and between 12 and the swage 11 and between the swage and the nut without likelihood of the bolts becoming unlocked. It is important that elongate tongues or fingers shall not be substituted for the stubs, and also that the root of the stubs shall not be reduced so as to leave any measurably resilient neck by reason of which the upsetting action is evaded and whereby the fingers might be sprung away from the thread.

In order to effect the results aimed at, it is necessary that the nut shall have a substantial body and that the root of the stubs connected to said body shall be substantial and that the taper of the frusto-conical extension formed by the stubs, and the taper of the frusto-conical seat for said extension shall be relatively such that when the nut is screwed home to force the stubs into said seat, a permanent set will be imposed upon the metal of the stub.

The taper must be neither too acute nor too obtuse and the forward projections must not be too long or too short, the purpose being to eliminate all liability of said projections being sprung away from the bolt when the pressure between the taper faces of the projections and the taper face of the swage is relieved.

As hereinbefore stated, the angle of the converging face of the stubs to the axis of the nut should be about 25° and the angle of the taper face of the swaging seat to the axis of the nut should be about 27°. A divergence from this angle of as much as 3° or 4° may be allowed without entirely avoiding the advantages aimed at, if the proportion between the angles is practically maintained; but the exact angles above given are deemed most effective for securing a perfect locking; and substantially such angles must be present to attain the requisite results.

It is thus seen that the bolt lock in its normal locking condition comprises a nut having one or more lugs upset to engage the bolt to prevent the nut from turning on the bolt.

It will be understood from examination of Fig. 2 in comparison with Fig. 1, that when the nut is tightened, the rear faces of the threads carried by the nut engage the front face of the bolt thread continuously from end to end of the nut thread and continuously from end to end of each stub thread although such engagement may extend only a part of the way to the bottom of the thread.

By examining Fig. 3 it will be seen that when the set has been imposed upon the stubs the stub threads wedge firmly into the bolt thread at all points of engagement and that these threads are made to fit exactly while the frictional contact of the nut thread with the bolt thread remains as firm as before. By examination of Fig. 4 in comparison with Fig. 3, it is seen that the relation of the threads as established by upsetting the stubs is not disturbed by unscrewing the nut away from the swage.

It will also be understood that the rear threads of the upset stubs will act upon the bolt threads to correct irregularities therein as the nut is screwed off the bolt so that the nut may again be screwed onto the bolt. In actual practice it is found that the threads of the upset stubs fit the bolt thread so tight that the nut cannot be turned on or off by hand but that it can be readily turned by a wrench, and that it is proof against unscrewing automatically or from the effect of vibration.

I have determined by tests that extended to twisting a bolt in two that this bolt, stud and nut lock does not operate to distort, strip or break the thread; and that even though the nut may be set so tight as to burst the bolt, the portion of the bolt remaining in the nut may be as easily unscrewed therefrom as though the nut had not been screwed home.

It is understood that the stud 1″ in Fig. 7 is to all effects an equivalent of the bolt shown in other views and that the term bolt as employed in the claim includes a stud as well as a bolt.

I claim:

The improvement set forth in nut and bolt locks of that class in which a washer and a nut having a split conical end are elements which comprises, in combination with a washer having a conical cup, a nut having stubs at one end that are of less length than the conical cup and that constitute a split taper end for the nut, which end has a more acute angle than the conical seat, so that as the nut is screwed home by thumb and finger, contact between the washer and the stubs will occur only at the tips of the stubs, the material of said stubs being adapted to receive a permanent set at that position of the stubs relative to the nut body, in which position the taper of the stubs and that of the seat are brought into conformity to each other by the pressure exerted by screwing the nut home by means of a wrench so as to allow, and for the purpose of allowing, a fresh nut to be screwed home freely by thumb and finger of the workman until the tip of the nut engages the washer, and then by a few turns of the nut by means of a wrench, to give a permanent set to the stubs whereby the nut is thus transformed at the close of the operation of screwing it home, into a friction tight nut which can only be turned on the bolt by a wrench irrespective of the subsequent relative positions of the nut and the washer on the bolt.

In testimony whereof, I have hereunto set my hand at Los Angeles, California, this 8th day of June, 1917.

ADOLPH B. JOHNSON.

Witness:
JAMES R. TOWNSEND.